(12) United States Patent
Yang et al.

(10) Patent No.: US 12,326,369 B2
(45) Date of Patent: Jun. 10, 2025

(54) TEMPERATURE SENSING MODULE AND ELECTRONIC DEVICE HAVING THE SAME

(71) Applicant: Chicony Electronics Co., Ltd., New Taipei (TW)

(72) Inventors: Cheng-Hun Yang, New Taipei (TW); Hsin-Chun Huang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 720 days.

(21) Appl. No.: 17/554,178

(22) Filed: Dec. 17, 2021

(65) Prior Publication Data

US 2022/0291046 A1 Sep. 15, 2022

(30) Foreign Application Priority Data

Mar. 10, 2021 (TW) ................................ 11010859.4

(51) Int. Cl.
*G01J 5/04* (2006.01)
*G01J 5/00* (2022.01)
*G01J 5/0806* (2022.01)
*G01J 5/0875* (2022.01)

(52) U.S. Cl.
CPC ............. *G01J 5/041* (2013.01); *G01J 5/0025* (2013.01); *G01J 5/0806* (2013.01); *G01J 5/0875* (2013.01)

(58) Field of Classification Search
None
See application file for complete search history.

(56) References Cited

U.S. PATENT DOCUMENTS

| 9,841,202 | B2 | 12/2017 | Shikii et al. |
| 10,670,465 | B2 | 6/2020 | Sun et al. |
| 2008/0088951 | A1* | 4/2008 | Nakanishi ............ G02B 13/008 359/785 |
| 2014/0088434 | A1* | 3/2014 | Roth .................... A61B 5/7275 600/473 |
| 2016/0282187 | A1 | 9/2016 | Sun et al. |

FOREIGN PATENT DOCUMENTS

| CN | 103797344 A | 5/2014 |
| CN | 205157051 U | 4/2016 |
| JP | 2012198191 A | 10/2012 |
| KR | 20150019854 A | 2/2015 |
| TW | 201447541 A | 12/2014 |

* cited by examiner

*Primary Examiner* — Erica S Lin
(74) *Attorney, Agent, or Firm* — MUNCY, GEISSLER, OLDS & LOWE, P.C.

(57) ABSTRACT

A temperature sensing module includes a hollow base, an infrared temperature sensor, and a condenser lens. The hollow base has a through hole, a first end, and a second end opposite to the first end. The first end has a first opening, the second end has a second end, and the through hole is in communication between the first opening and the second opening. The infrared temperature sensor is disposed in the through hole and adjacent to the second opening. The infrared temperature sensor includes a photosensitive surface, and the photosensitive surface faces the first opening. The condenser lens is disposed in the through hole and adjacent to the first opening. The condenser lens corresponds to the photosensitive surface of the infrared temperature sensor. An electronic device having the temperature sensing module is also provided.

8 Claims, 5 Drawing Sheets

TEMPERATURE SENSING MODULE AND ELECTRONIC DEVICE HAVING THE SAME

CROSS-REFERENCE TO RELATED APPLICATION

This non-provisional application claims priority under 35 U.S.C. § 119(a) to Patent Application No. 110108594 filed in Taiwan, R.O.C. on Mar. 10, 2021, the entire contents of which are hereby incorporated by reference.

BACKGROUND

Technical Field

The instant disclosure relates to a sensing module, in particular, to a temperature sensing module and an electronic device having the same.

Related Art

Common body-temperature measurement tools can be divided into the contact type and the noncontact type. The contact type tool may be for example mercury thermometers or digital rapid body-temperature meters, which perform the body measurement through contacting parts of the human body (e.g., the mouth or the underarm portion). The noncontact type tool may be for example ear thermometers or forehead thermometers, which perform the body measurement through approaching and aiming at the ear portion or the forehead of the human.

SUMMARY

Nevertheless, regarding these measurement manners, to measure and monitor the body temperature at any time, when the user goes out, the user has to bring the body-temperature measurement tool additionally, thus causing the disturbance and the inconvenience for the user. Moreover, the body-temperature measurement tools have to contact or to be very close to the human body for measuring the body temperature accurately.

For instance, as shown in FIG. 1, taking forehead thermometers as an example, the measurements of the forehead thermometers mostly are achieved through the infrared temperature sensors. However, the field of view (FOV) of the infrared temperature sensor of the forehead thermometer known to the inventor is equal to or more than 45 degrees. Consequently, upon the measurement, the forehead thermometer has to be configured to be very close to the user's forehead (e.g., the measurement distance is equal to or less than 5 cm).

In view of this, in one embodiment, a temperature sensing module is provided. The temperature sensing module comprises a hollow base, an infrared temperature sensor, and a condenser lens. The hollow base has a through hole, a first end, and a second end opposite to the first end. The first end has a first opening, the second end has a second end, and the through hole is in communication between the first opening and the second opening. The infrared temperature sensor is disposed in the through hole and adjacent to the second opening. The infrared temperature sensor comprises a photosensitive surface, and the photosensitive surface faces the first opening. The condenser lens is disposed in the through hole and adjacent to the first opening. The condenser lens corresponds to the photosensitive surface of the infrared temperature sensor.

In another embodiment, an electronic device is provided. The electronic device comprises a display and a temperature sensing module. The display comprises a display screen and a bezel around the display screen. The bezel has a via hole. The temperature sensing module is disposed in the bezel and corresponding to the via hole. The temperature sensing module comprises a hollow base, an infrared temperature sensor, and a condenser lens. The hollow base has a through hole, a first end, and a second end opposite to the first end. The first end has a first opening, the second end has a second opening, the through hole is in communication between the first opening and the second opening, and the first opening is nearer to the via hole as compared with the second opening. The infrared temperature sensor is disposed in the through hole and adjacent to the second opening. The infrared temperature sensor comprises a photosensitive surface, and the photosensitive surface faces the first opening. The condenser lens is disposed in the through hole and adjacent to the first opening, and the condenser lens corresponds to the photosensitive surface of the infrared temperature sensor.

Based on the above, in the temperature sensing module according to one or some embodiments of the instant disclosure, the condenser lens corresponds to the photosensitive surface of the infrared temperature sensor. Hence, the measurement angle or field of view (FOV) of the entire temperature sensing module can be reduced, thus allowing the temperature sensing module to be appliable for common electronic devices (such as smartphones, tablet computers, or displays) for performing remote body temperature measurement. Therefore, when the user goes out, to measure and monitor the body temperature of the user at any time, the user does not need to bring the body-temperature measurement tool additionally.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, same reference numbers designate identical or similar elements.

Figure 2:
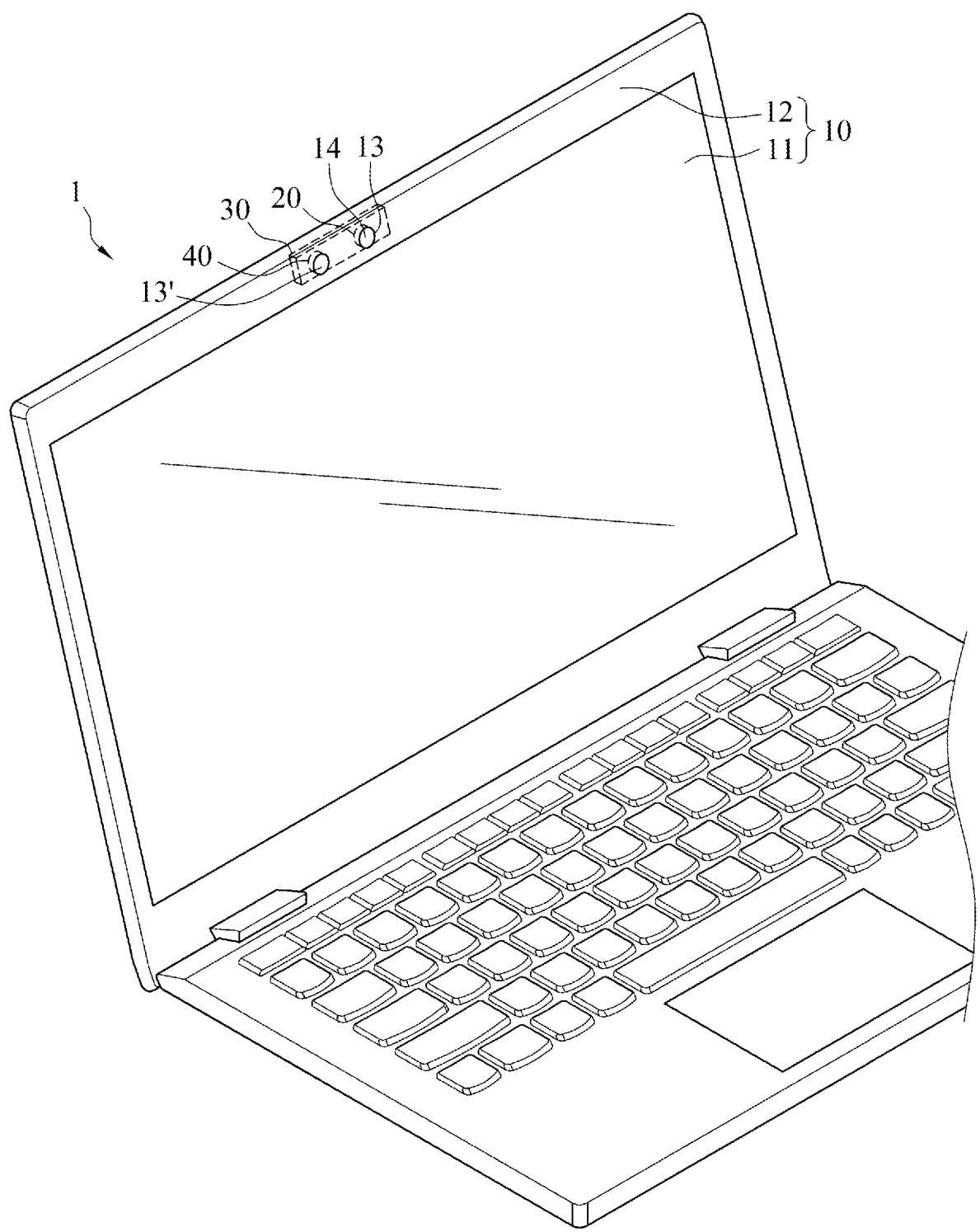
FIG. 2 illustrates a perspective view of an electronic device according to an exemplary embodiment of the instant disclosure.
Figure 3:
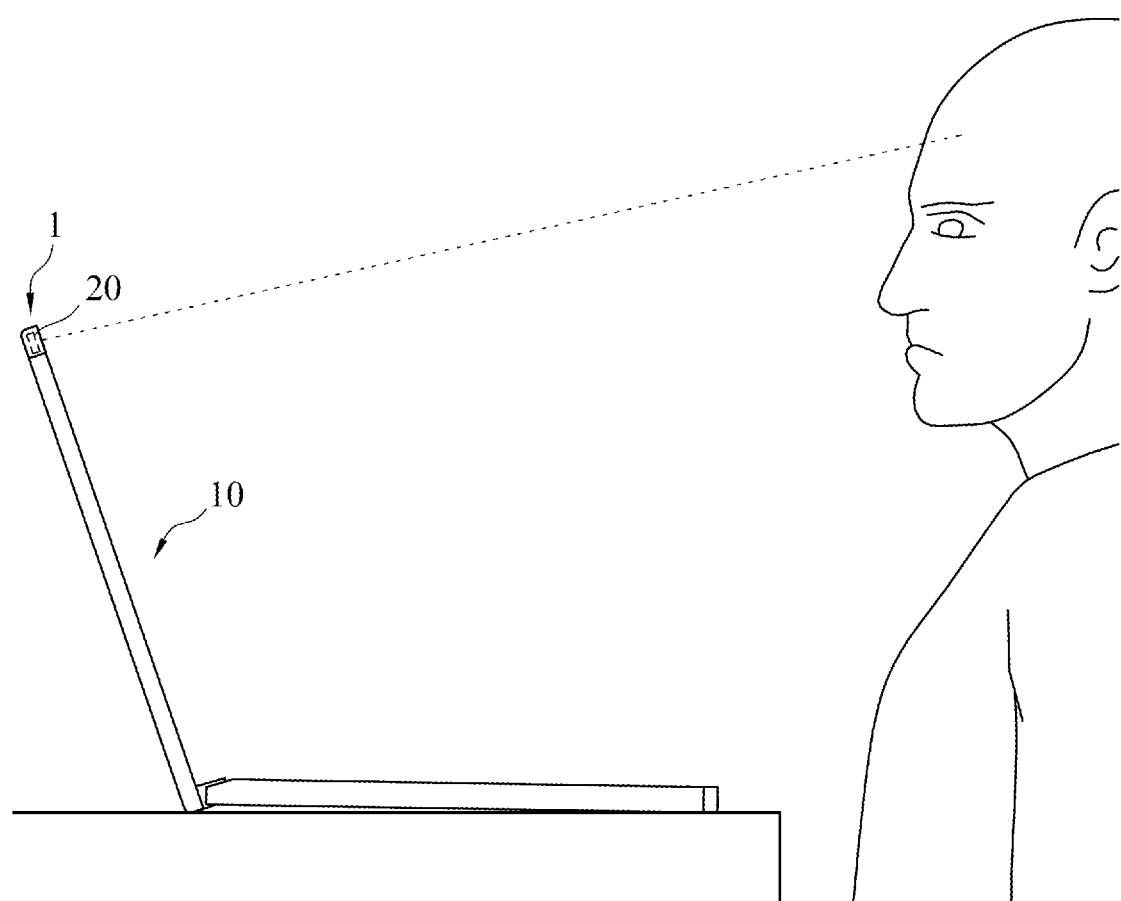
FIG. 3 illustrates a schematic operational view of the electronic device of the exemplary embodiment.
Figure 4:
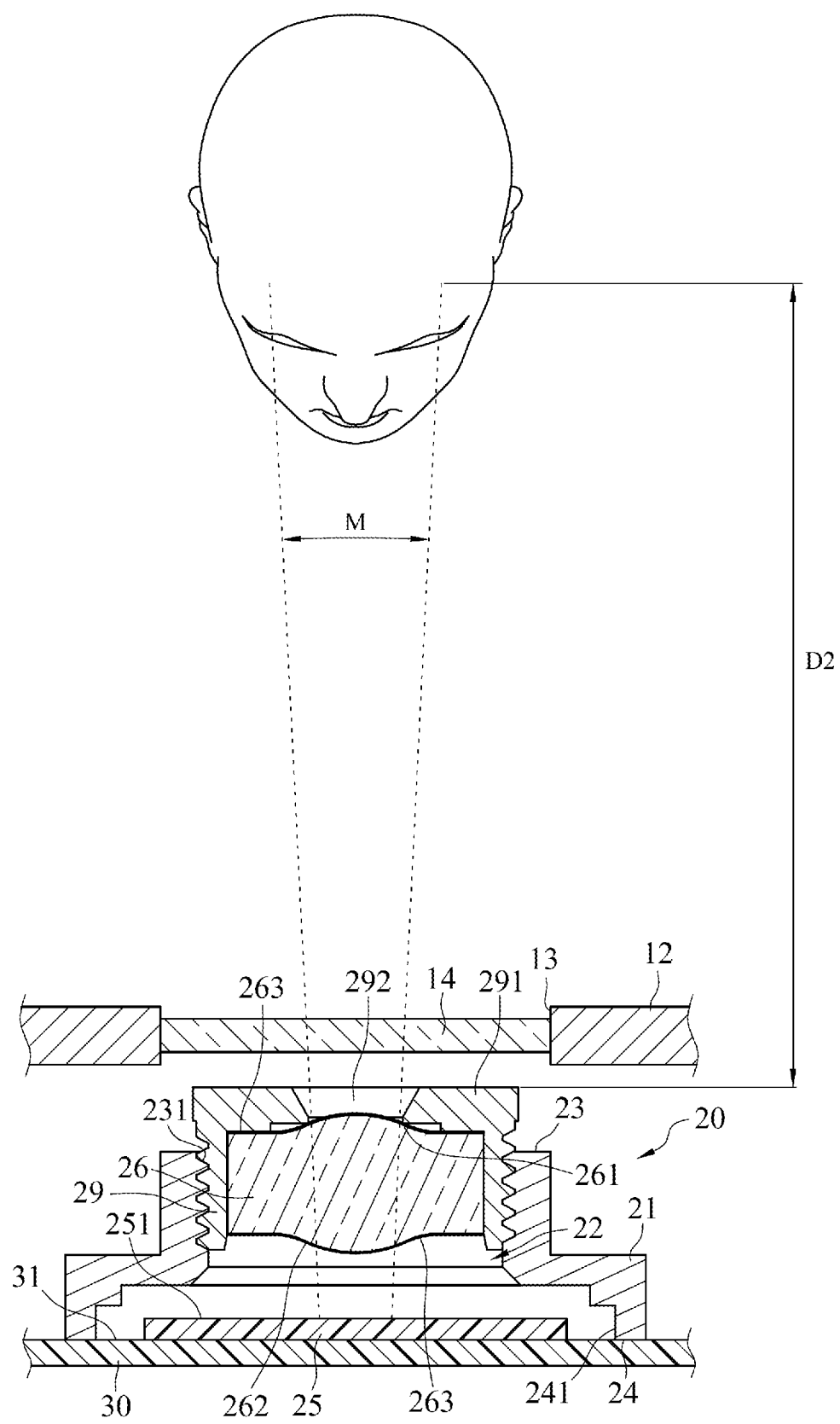
FIG. 4 illustrates a cross-sectional view of the electronic device of the exemplary embodiment.

FIG. 2 illustrates a perspective view of an electronic device according to an exemplary embodiment of the instant disclosure. FIG. 3 illustrates a schematic operational view of the electronic device of the exemplary embodiment. FIG. 4 illustrates a cross-sectional view of the electronic device of the exemplary embodiment. As shown in FIGS. 2 to 4, in this embodiment, the electronic device 1 is a notebook computer as an illustrative example. The electronic device 1 comprises display 10 and a temperature sensing module 20. The temperature sensing module 20 is assembled on the display 10 for detecting the body temperature of a human. However, it is understood that the foregoing embodiment is provided as an illustrative example; in some embodiments, the electronic device 1 may be a smartphone, a tablet computer, a personal digital assistant, a display, or other portable electronic devices.

As shown in FIGS. 2 to 4, in this embodiment, the display 10 comprises a display screen 11 and a bezel 12 around the display screen 11. One of the sides of the bezel 12 has a via hole 13. The temperature sensing module 20 is disposed in the bezel 12 and corresponds to the via hole 13. Hence, the temperature sensing module 20 is not shielded by the bezel 12 and can perform body-temperature measurements for human properly.

As shown in FIGS. 2 to 4, the temperature sensing module 20 comprises a hollow base 21, an infrared temperature sensor 25, and a condenser lens 26. In this embodiment, the hollow base 21 has a through hole 22, a first end 23, and a second end 23 opposite to the first end 23. The first end 23 has a first opening 231. The second end 24 has a second opening 241. The first opening 231 faces the via hole 13 of the bezel 12 of the display 10, and the first opening 231 is nearer to the via hole 13 as compared with the second opening 241. In other words, in this embodiment, the distance between the first opening 231 and the via hole 13 is less than the distance between the second opening 241 and the via hole 13. The through hole 22 is in communication between the first opening 231 and the second opening 241, so that the hollow base 21 is a hollow cylinder structure. The shape of the through hole 22 may be round, elliptical, square, or irregular, embodiments are not limited thereto.

As shown in FIGS. 2 to 4, the infrared temperature sensor 25 is disposed in the through hole 22 and adjacent to the second opening 241. In other words, in this embodiment, the distance between the infrared temperature sensor 25 and the first opening 231 is greater than the distance between the infrared temperature sensor 25 and the second opening 241. In some embodiments, the infrared temperature sensor 25 may be a thermoelectric-type infrared sensor or a quantum-type infrared sensor.

As shown in FIG. 4, the infrared temperature sensor 25 comprises a photosensitive surface 251, and the photosensitive surface 251 faces the first opening 231. Accordingly, the photosensitive surface 251 of the infrared temperature sensor 25 can receive the infrared lights transmitted from an external object. Hence, the surface temperature of the external object can be measured according to the amount of the infrared lights. For example, the greater amount of the infrared lights received by the photosensitive surface 251 of the infrared temperature sensor 25 is, the higher the surface temperature of the external object is.

As shown in FIGS. 2 to 4, the condenser lens 26 is disposed in the through hole 22 and adjacent to the first opening 231. In some embodiments, the condenser lens 26 may be made of glass or optical-grade transparent plastic. Moreover, the condenser lens 26 corresponds to the photosensitive surface 251 of the infrared temperature sensor 25. Accordingly, after the infrared lights transmitted from the external object enter into the electronic device 1 from the via hole 13 of the bezel 12 of the display 10, the infrared lights are condensed by the condenser lens 26 and then transmitted to the photosensitive surface 251 of the infrared temperature sensor 25. Hence, the measurement angle of the entire temperature sensing module 20 can be reduced so as to increase the measurable distance for the temperature sensing module 20.

Figure 1:
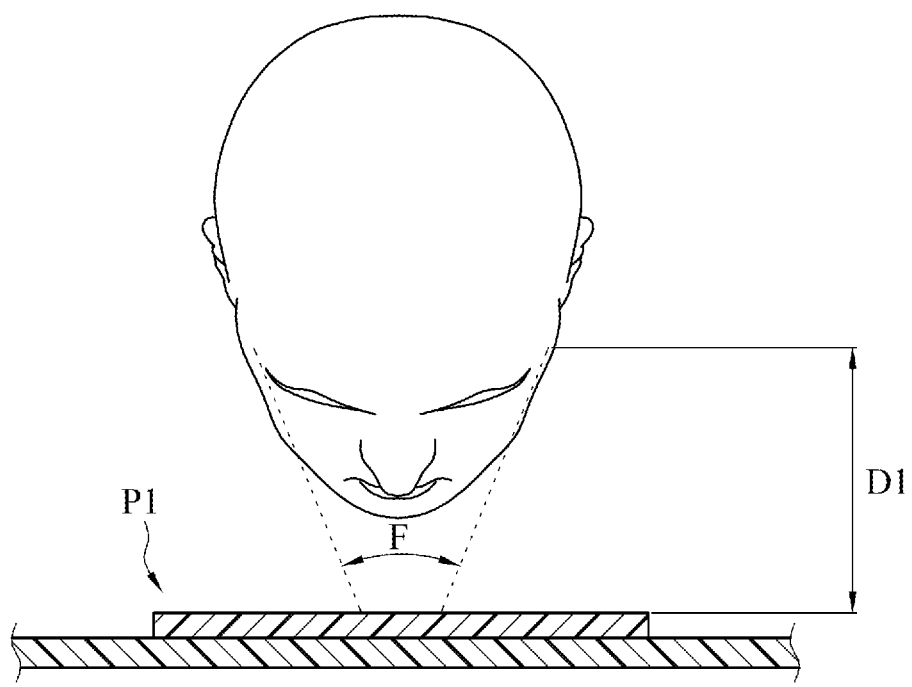
FIG. 1 illustrates a schematic operational view of an infrared temperature sensor known to the inventor.

Based on the above, specifically, please refer to FIG. 1, FIG. 1 illustrates a schematic operational view of an infrared temperature sensor P1 known to the inventor. In most cases, the field of view (FOV) of the known infrared temperature sensor P1 is equal to or more than 45 degrees. Consequently, upon the measurement, the product having the known infrared temperature sensor P1 (for example, a forehead thermometer) has to be configured to be very close to the user's forehead (e.g., the measurement distance is equal to or less than 5 cm). On the other hand, as shown in FIG. 4, in the electronic device 1 of the embodiment of the instant disclosure, the condenser lens 26 corresponds to the photosensitive surface 251 of the infrared temperature sensor 25. Therefore, after the infrared lights transmitted from the external object enter into the electronic device 1 from the via hole 13 of the bezel 12 of the display 10, the infrared lights are condensed by the condenser lens 26 and then transmitted to the photosensitive surface 251 of the infrared temperature sensor 25. Hence, the measurement angle M of the entire temperature sensing module 20 can be reduced, for example, the measurement angle M may be reduced to 6-10 degrees, which is much smaller than the field of the view F of the known infrared temperature sensor P1. Accordingly, due to the reduction of the measurement angle M of the temperature sensing module 20, the measurement distance D2 of the temperature sensing module 20 can be greatly increased. For example, the measurement distance D2 can be increased to be equal to or more than 40 cm, which is much longer than the measurement distance D1 of the known infrared temperature sensor P1. Therefore, according to one or some embodiments, the temperature sensing module 20 can be applied to common electronic devices 1 (e.g., the smartphones, the tablet computers, and the displays) for remote body temperature measurement. Hence, when the user goes out, to measure and monitor the body temperature of the user at any time, the user does not need to bring the body-temperature measurement tool additionally.

In some embodiments, the condenser lens 26 may be a lens having a thickness middle portion and a thinner edge portion to have the optical condensing function. For example, the condenser lens 26 may be a dual-convex lens, a plano-convex lens, or a concave-convex lens. As shown in FIG. 4, in this embodiment, the condenser lens 26 has a first surface 261 and a second surface 262 opposite to the first surface 261. In this embodiment, the first surface 261 and the second surface 262 are both convex surfaces to configure the condenser lens 26 to be a dual-convex lens, but the instant disclosure is not limited thereto. In some embodiments, for the condenser lens 26, one of the first surface 261 and the second surface 262 may be a convex surface, and the other surface is a plane surface. Alternatively, in another embodiment, one of the first surface 261 and the second surface 262 may be a convex surface, and the other surface is a concave surface.

As shown in FIG. 4, in this embodiment, a coating layer 263 is further disposed on the surface of the condenser lens 26 so as to increase the optical transmittance of the condenser lens 26. In this embodiment, the coating layers 263 are disposed on both the first surface 261 and the second surface 262 of the condenser lens 26, thereby increasing the accuracy of the temperature sensing of the temperature sensing module 20. In some embodiments, the coating layer 263 may be disposed on the first surface 261 or on the second surface 262. For example, in the case that the optical transmittance of the condenser lens 26 is about 91-92%, it is realized that, the optical transmittance of the condenser lens 26 can be increased to 94-95% when the coating layer 263 is disposed on one of the surfaces of the condenser lens 26, and the optical transmittance of the condenser lens 26 can be further increased to 98-99% when the coating layers 263 are disposed on both surfaces of the condenser lens 26.

As shown in FIGS. 2 to 4, in this embodiment, an outer cap 14 is further disposed in the via hole 13 of the bezel 12 of the display 10 for protecting the temperature sensing module 20. Moreover, the infrared lights transmitted by the external object can still pass through the outer cap 14 to be transmitted to the infrared temperature sensor 25 for temperature sensing. In some embodiments, the outer cap 14 may be an optical filter plate, and the optical filter plate allows infrared lights within certain wavelengths (e.g., the certain wavelengths is in a range between 6000 nm and 12000 nm) to be capable of passing through the outer cap 14, so that the infrared lights can be transmitted to the infrared temperature sensor 25. Accordingly, the infrared lights with wavelengths not within the certain wavelengths can be filtered by the optical filter plate. Hence, the human body temperature to be measured by the temperature sensing module 20 can be obtained properly, thereby increasing the measurement accuracy of the temperature sensing module 20.

Further, as shown in FIGS. 2 to 4, the temperature sensing module 20 may comprise a circuit board 30, the second end 24 of the hollow base 21 is fixed on the circuit board 30, and the infrared temperature sensor 25 is disposed on an inner surface 31 of the circuit board 30 in the through hole 22. Accordingly, the infrared lights do not enter into the temperature sensing module 20 from the second opening 241 at the second end 24 of the hollow base 21 to prevent the external lights affecting the measurement accuracy of the infrared temperature sensor 25.

As shown in FIGS. 2 to 4, in this embodiment, the electronic device 1 further comprises a camera module 40 so as to allow the electronic device 1 to have the image-capturing, video-recording, or web-video functions. The camera module 40 and the temperature sensing module 20 may be fixed on the same circuit board 30 to reduce the layout space for the components. In this embodiment, the bezel 12 of the display 10 further has another via hole 13', and the via holes 13, 13' are aligned side-by-side. The camera module 40 is disposed in the bezel 12 and corresponds to the via hole 13'. Therefore, the camera module 40 is not shielded by the bezel 12 to perform the image-capturing function properly.

As shown in FIGS. 2 to 4, the condenser lens 26 may be assembled in the through hole 22 and adjacent to the first opening 231 through a lens barrel 29. In this embodiment, the condenser lens 26 is fixed in the lens barrel 29, and the lens barrel 29 is assembled on the first end 23 of the hollow base 21. In this embodiment, the outer wall of the lens barrel 29 and the inner wall of the through hole 22 of the hollow base 21 may have male and female threading patterns, respectively, so that the lens barrel 29 may be threaded with and fixed in the through hole 22 of the hollow base 21. In some embodiments, the lens barrel 29 and the hollow base 21 may be assembled with each other through gluing, engaging, welding, or the like.

Further, as shown in FIGS. 2 to 4, in this embodiment, an end of the lens barrel 29 away from the infrared temperature sensor 25 comprises a light shielding plate 291, the light shielding plate 291 has a light transmissive window 292, and a size of the light transmissive window 292 is less than a size of the first opening 231. The size of the light transmissive window 292 may correspond to the measurement angle M of the temperature sensing module 20, the lights out of the range of the measurement angle M are thus shielded by the light shielding plate 291 to prevent stray lights from being transmitted to the infrared temperature sensor 25 to affect the sensing performance.

Figure 5:
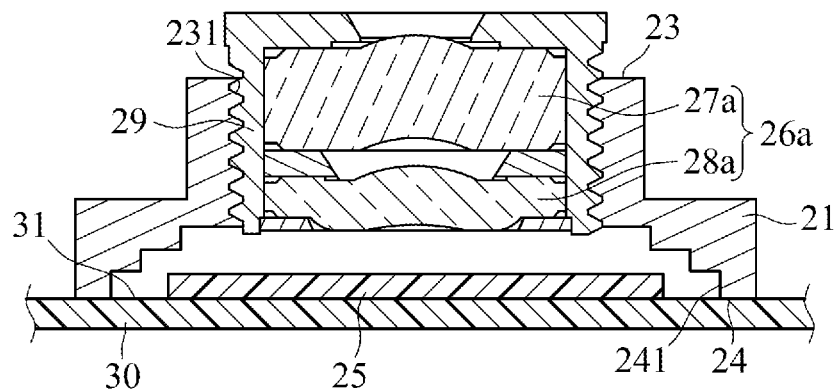
FIG. 5 illustrates a cross-sectional view of a temperature sensing module according to another exemplary embodiment of the instant disclosure.

In some embodiments, instead of being a single lens, the condenser lens 26 may be formed by several lenses. As shown in FIG. 5, FIG. 5 illustrates a cross-sectional view of the temperature sensing module 20 according to another exemplary embodiment of the instant disclosure. The difference between this embodiment and the embodiment shown in FIG. 4 is at least that, in this embodiment, the condenser lens 26a comprises a first lens 27a and a second lens 28a, and the first lens 27a and the second lens 28a are stacked with each other. Accordingly, the temperature sensing module 20 can have more different measurement angles M and different measurement distances D2 by using the combination of the first lens 27a and the second lens 28a (as compared with the embodiment shown in FIG. 4) to adapt the application distances for different electronic devices 1. For example, the type of the first lens 27a may be the same as the type of the second lens 28a. Alternatively, as shown in FIG. 5, the type of the first lens 27a may be different from the type of the second lens 28a. For instance, at least one parameter selected from the thickness, the surface curvature, and the shape of the first lens 27a and the second lens 28a are different, so that the temperature sensing module 20 can provide more different measurement angles M and different measurement distances D2.

Furthermore, for example, as shown in FIG. 4, when the condenser lens 26 is a single lens, the available measurement angle M generated by modifying the surface curvature or lens thickness of the condenser lens 26 is 6-10 degrees, and the corresponding available measurement distance D2 is 40-50 cm. Please refer to FIG. 5, when the condenser lens 26a comprises the first lens 27a and the second lens 28a, the available measurement angle M generated by modifying the surface curvature or lens thickness of the first lens 27a and the second lens 28a of the condenser lens 26a is increased to be 5-11 degrees, and the corresponding available measurement distance D2 is increased to be 35-55 cm. Therefore, the more the number of the lenses of the condenser lens 26a is, the more the different measurement angles M and measurement distances D2 is, thereby allowing to be adapted to more different electronic devices 1.

Figure 6:
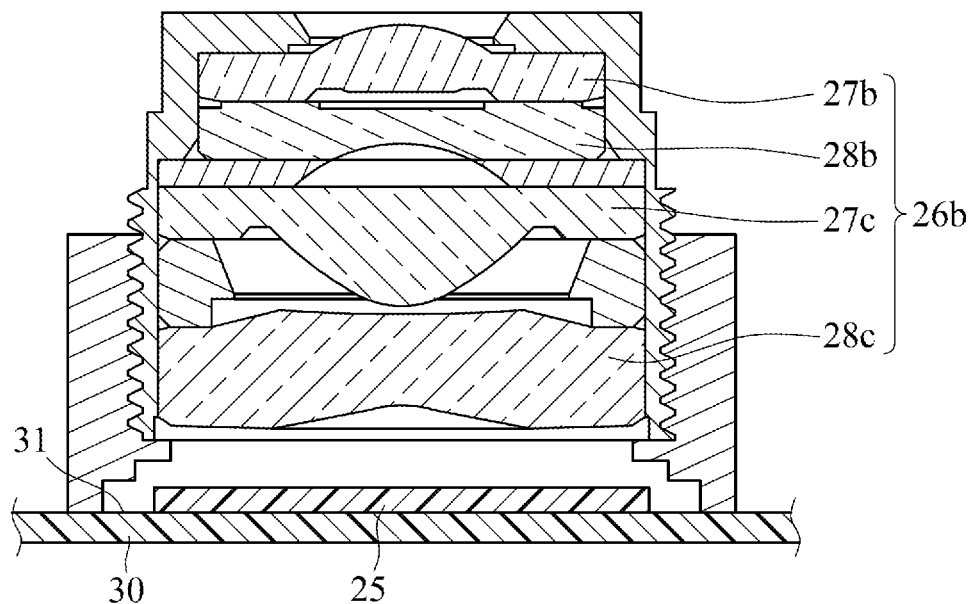
FIG. 6 illustrates a cross-sectional view of a temperature sensing module according to yet another exemplary embodiment of the instant disclosure.

Further, as shown in FIG. 6, FIG. 6 illustrates a cross-sectional view of a temperature sensing module 20 according to yet another exemplary embodiment of the instant disclosure. The difference between this embodiment and the embodiment shown in FIG. 5 is at least that, in this embodiment, the condenser lens 26b comprises four lenses (a first lens 27b, a second lens 28b, a third lens 27c, and a fourth lens 28c), and the first lens 27b, the second lens 28b, the third lens 27c, and the fourth lens 28c are stacked with each other. Accordingly, by increasing the number of the lenses of the condenser lens 26b, different combinations of lenses can be achieved, thereby allowing more different measurement angles M and measurement distances D2 to be generated, such that the temperature sensing module 20 can be adapted to different types of electronic devices 1. In some embodiments, the number of the lens of the condenser lens 26b may be three, five, or more than five, but the instant disclosure is not limited thereto.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A temperature sensing module comprising:
   a hollow base, having a through hole, a first end, and a second end opposite the first end, wherein the first end has a first opening, the second end has a second opening, and the through hole is in communication between the first opening and the second opening;
   an infrared temperature sensor disposed in the through hole and adjacent to the second opening, wherein the infrared temperature sensor comprises a photosensitive surface, and the photosensitive surface faces the first opening;
   a condenser lens disposed in the through hole and adjacent to the first opening, wherein the condenser lens corresponds to the photosensitive surface of the infrared temperature sensor; and
   a lens barrel, wherein the lens barrel is assembled on the first end of the hollow base, and the condenser lens is disposed in the lens barrel,
   wherein an outer wall of the lens barrel and an inner wall of the through hole of the hollow base have male and female threading patterns, respectively, and the lens barrel is threaded with and fixed in the through hole of the hollow base.

2. The temperature sensing module according to claim 1, further comprising a circuit board, wherein the second end of the hollow base is fixed on the circuit board, and the infrared temperature sensor is disposed on an inner surface of the circuit board in the through hole.

3. The temperature sensing module according to claim 1, wherein an end of the lens barrel away from the infrared temperature sensor comprises a light shielding plate, the light shielding plate has a light transmissive window, and a size of the light transmissive window is less than a size of the first opening.

4. The temperature sensing module according to claim 1, wherein the condenser lens has a first surface and a second surface opposite to the first surface, and the first surface is a convex surface.

5. The temperature sensing module according to claim 4, wherein the second surface is a convex surface or a concave surface.

6. The temperature sensing module according to claim 1, wherein the condenser lens comprises a first lens and a second lens, and the first lens and the second lens are stacked with each other.

7. The temperature sensing module according to claim 6, wherein a type of the first lens is different from a type of the second lens.

8. The temperature sensing module according to claim 1, wherein a coating layer is further disposed on a surface of the condenser lens.

* * * * *